Sept. 1, 1925.

J. D. SHIPTON

GRAIN TRIMMING DEVICE

Filed Feb. 29, 1924

1,551,971

Inventor
James D. Shipton.

By Albert E. Dietrich
Attorney

Patented Sept. 1, 1925.

1,551,971

UNITED STATES PATENT OFFICE.

JAMES D. SHIPTON, OF VANCOUVER, BRITISH COLUMBIA, CANADA.

GRAIN-TRIMMING DEVICE.

Application filed February 29, 1924. Serial No. 696,064.

*To all whom it may concern:*

Be it known that I, JAMES D. SHIPTON, citizen of the Dominion of Canada, residing at Vancouver, in the Province of British Columbia, Canada, have invented certain new and useful Improvements in Grain-Trimming Devices, of which the following is a specification.

This invention is designed to effect the trimming of a bulk cargo of grain or the like material in the hold of a vessel, and comprises a means for diverting the flow of the grain as delivered by gravity through a spout into the hold of a vessel, and for maintaining or accelerating that velocity whereby the grain may be projected into the remote corners of the hold to trim the cargo.

The invention is fully described in the following specification, reference being made to the drawings by which it is accompanied, in which.

Figure 1:
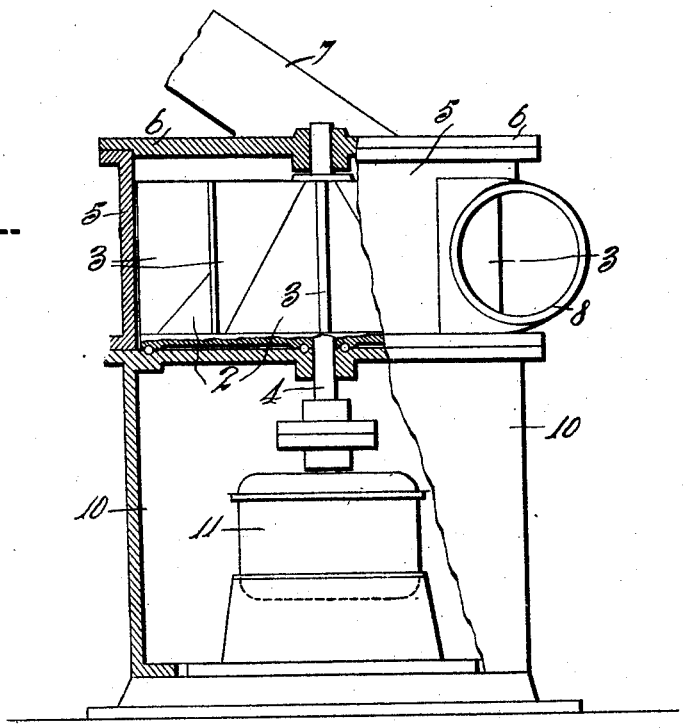
Fig. 1 is a sectional elevation of the grain projecting means.
Figure 2:
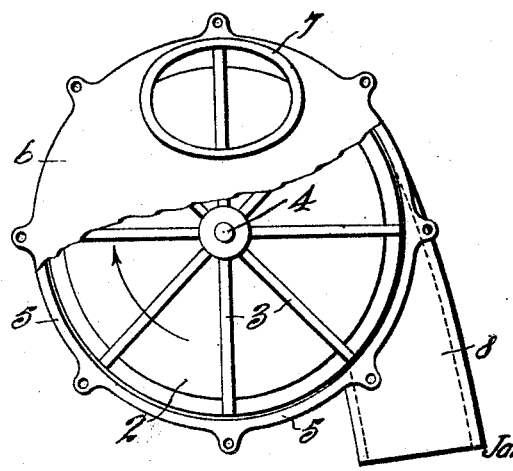
Fig. 2 is a sectional plan of the same.

The device comprises a conical body 2 having radial vanes 3 upwardly projecting from its conical surface. This vaned cone is secured on a shaft 4 to rotate on a vertical axis within a close fitting casing 5.

Through the cover 6 of this casing 5 the grain is delivered by gravity from the grain spout of the elevator to an aperture 7 which is angularly directed forward toward the direction of rotation of the cone, indicated by the arrow, and is projected tangentially outward through a delivery spout 8 which is also curved toward the direction of rotation of the cone.

The casing 5, which encloses the vaned cone, is carried on a hollow base 10, being fitted thereon on a lathe turned seat that the casing 5 may be moved about the axis of rotation to turn the delivery spout 8 in any desired angle, and may be secured by bolts or screws in any position to which it is set, the bolts being pitched at equal distances apart.

The flow of grain as delivered by gravity into the spout 7 falls on the surface of the cone 2 and is, by its contact with the surface of the revolving cone and the vanes 3 thereon, forcibly projected outward through the spout 8 which may be angled to deliver the grain to remote parts of the hold.

The shaft 4 of the cone is directly connected to that of a motor 11, preferably secured in the hollow base 10.

As illustrated in the drawing, the grain is delivered from the accelerator through a single spout but it may be found desirable to deliver from a series of spouts from the outer circle of the casing 5, in which case the gravity delivery 7 from the elevator will connect to the central portion of the cover 6 to deliver to the central portion of the conical body 2, which, instead of being a straight sloped cone, as drawn, will be shaped as a concave conoid.

Having now particularly described my invention, I hereby declare that what I claim as new and desire to be protected in by Letters Patent, is:

A means for accelerating the flow of grain as delivered by gravity into the hold of a ship and for diverting the direction of its movement, said means comprising a cylindrical casing having an outlet duct in an approximately horizontal plane with a delivery spout lying approximately tangential to the casing, a rotatable body of conical form with the small end up mounted within said casing, said body having annular ball races and said casing having annular ball recesses in its bottom and bearing balls in said recesses, said casing having a top closure plate with a bearing, said rotatable body having a shaft portion journalled in said bearing, said closure plate having an inlet opening adjacent to its periphery for depositing the grain on the outer zone of the rotatable body only and having provision to direct its flow toward the direction of rotation, said outlet being slightly in advance of the inlet, said rotatable body having radial faces on its outer surface, said casing having a bearing in its bottom and said rotatable body having a shaft portion projected through said last named bearing and power means coupled with said last named shaft portion for turning said rotatable body substantially as shown and described.

In testimony whereof I affix my signature.

JAMES D. SHIPTON.